United States Patent [19]

Irwin

[11] 4,229,860
[45] Oct. 28, 1980

[54] CATTLE SKINNING PROCESS AND APPARATUS THEREFOR

[76] Inventor: David C. Irwin, 2900 N. Grand, Amarillo, Tex. 79107

[21] Appl. No.: 860,120

[22] Filed: Dec. 13, 1977

Related U.S. Application Data

[63] Continuation of Ser. No. 766,121, Feb. 7, 1977, abandoned.

[51] Int. Cl.³ .............................................. A22B 5/16
[52] U.S. Cl. ............................................ 17/50; 17/21
[58] Field of Search ...................................... 17/21, 50

[56] References Cited

U.S. PATENT DOCUMENTS

| | | | |
|---|---|---|---|
| 3,209,395 | 10/1965 | Jones | 17/21 |
| 3,364,516 | 1/1968 | White | 17/21 |
| 3,737,949 | 6/1973 | Davis | 17/21 |

FOREIGN PATENT DOCUMENTS

| | | | |
|---|---|---|---|
| 60369 | 3/1971 | Australia | 17/21 |
| 600839 | 6/1960 | Canada | 17/21 |
| 1283605 | 8/1972 | United Kingdom | 17/21 |

OTHER PUBLICATIONS

*The National Provisioner*, "Stripper Bares Carcass at Platte Valley," pp. 14-18, Jul. 1969.

*Primary Examiner*—Willie G. Abercrombie
*Attorney, Agent, or Firm*—Ely Silverman

[57] ABSTRACT

A separately controlled vertically moveable frame support for a skinning drum and operator platform supports a separately controlled rotatable horizontal drum; the drum is provided with laterally spaced chains connectable to a centrally located pivotally and rotatably mounted carcass for hide removal therefrom. The apparatus, with operators thereon, operates on a carcass suspended by its hind legs at a variable speed of hide removal with a rapid overall speed of hide removal not limited by the maximum strength of adhesion of the hide to the carcass structures therebelow and automatically provides for directing attention and action of operators to those zones at which cutting action is required.

2 Claims, 18 Drawing Figures

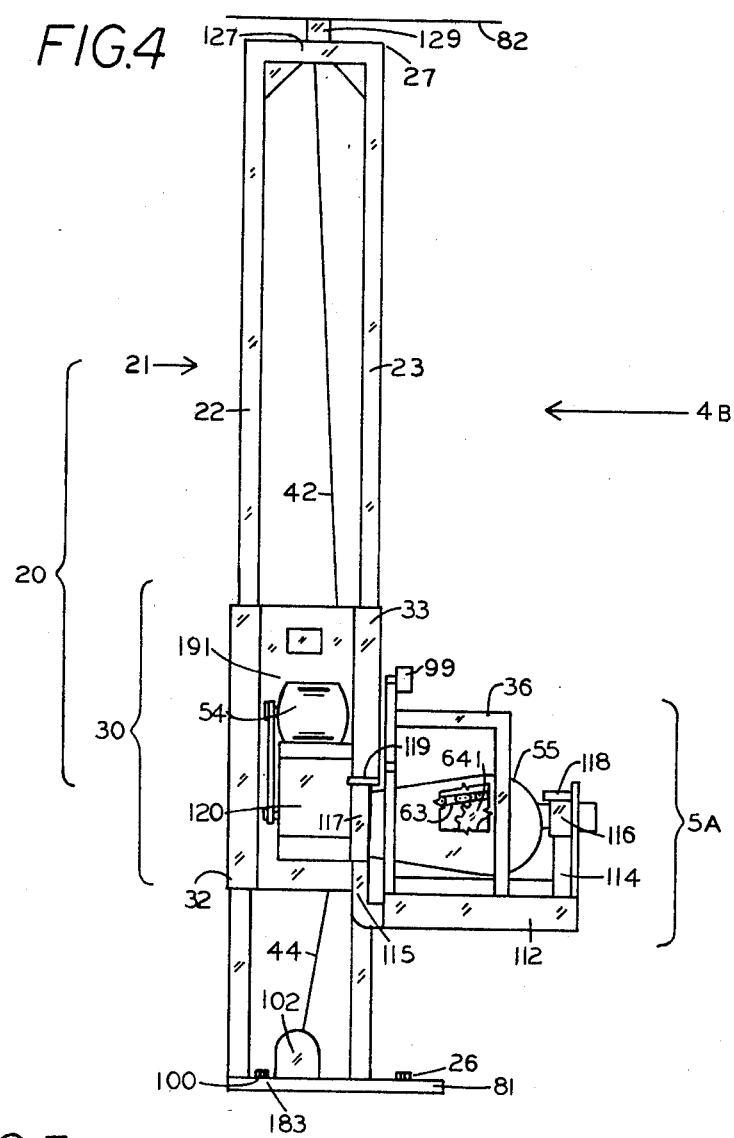
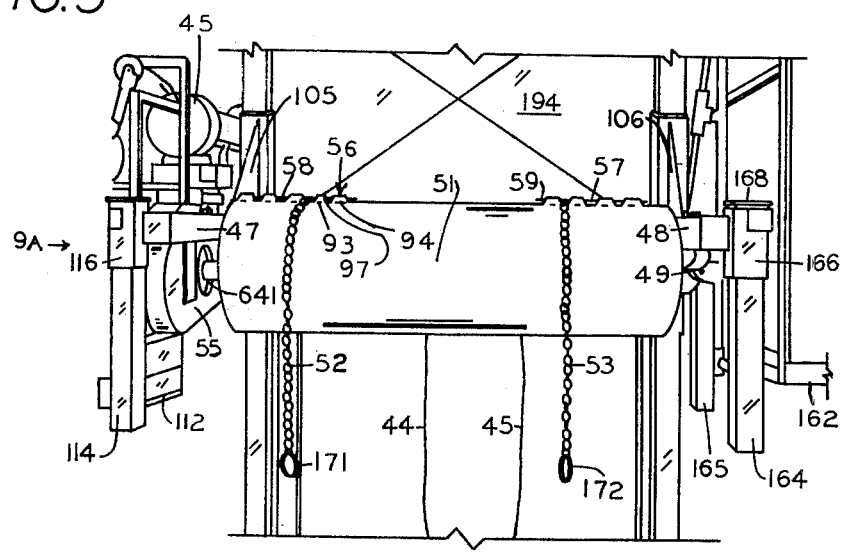

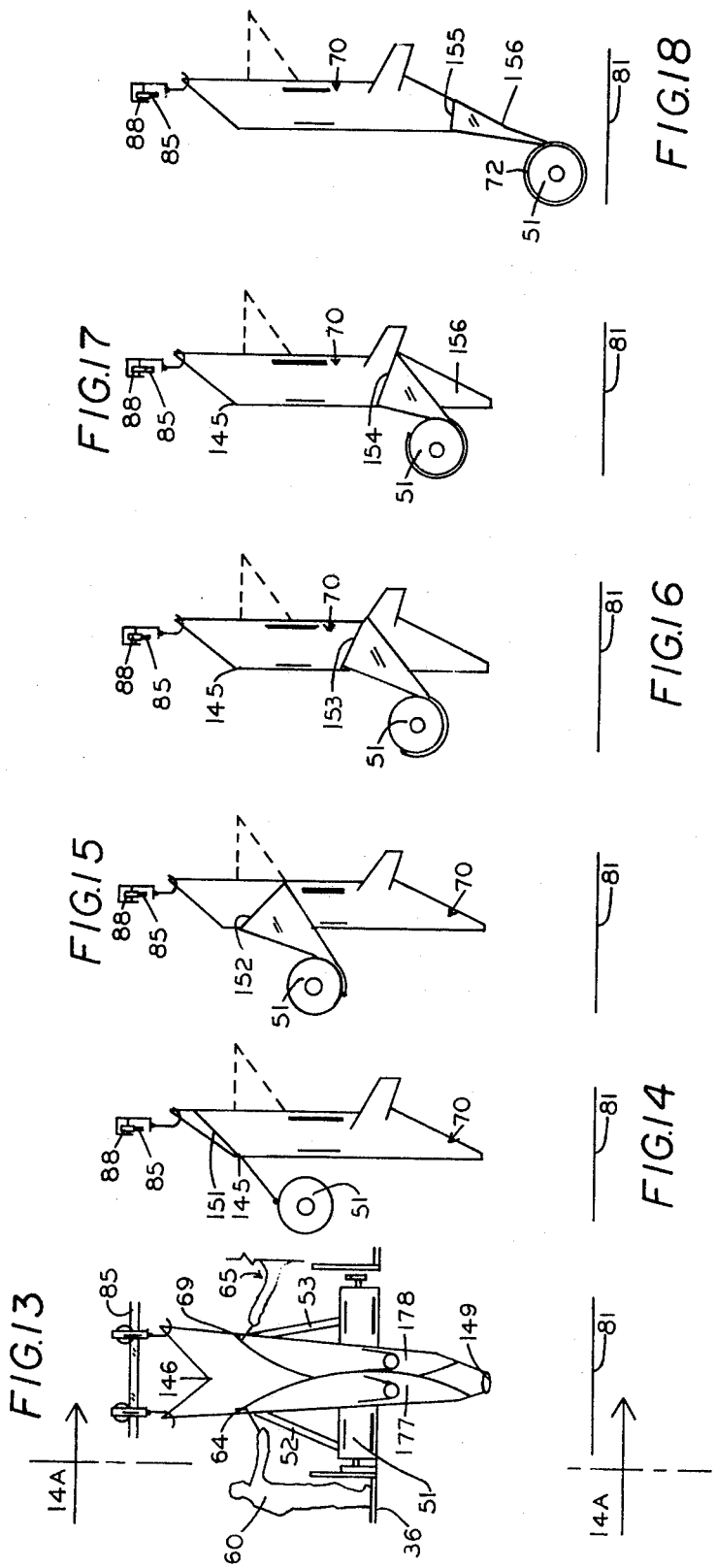

CATTLE SKINNING PROCESS AND APPARATUS THEREFOR

This is a continuation of Application Ser. No. 766,121 filed Feb. 7, 1977, now abandoned.

BACKGROUND OF THE INVENTION

1. Field of the Invention

The field of this invention is butchering and devices and processes to remove the skins of animals.

2. Description of the Prior Art

Prior attempts of operation for hide removal from carcasses at high speeds have pulled such carcasses from their supports and, accordingly, the speed of removal of hide from carcasses has been limited; the low rates of speed of automatic removal of hide from the carcasses have been expensive from the point of view of overall labor requirements and have required dangerous and/or slow work.

SUMMARY OF THE INVENTION

A varied rate of speed of vertical motion of an operator platform support frame from its uppermost position to its lowermost position while a skinning drum also rotates at controlled different speeds and provides sufficient time for operators to do such cutting as is needed at zones of maximum perimeter or strength of attachment of hide to deep fascia and with a long length of hide between drum and carcass avoid peaks of tensile stress as might cause the carcass back to be damaged or the carcass to be loosened from its supports. Such zones of slow motion of the operator compartment support frame avoids undesired high stresses, yet take only a small portion of the total cycle of time of operation while the remainder of the movement, which takes the major portion of length of operation over the carcass length, is smooth and rapid and quickly removes the hide from the carcass thereof without any knifing action by the operators on the carcass and the apparatus provides that movement of the carcass toward the operator on the side whereat the connection of the hide to the carcass needs the operator's attention occurs automatically.

Accordingly, the apparatus provides a process developing and utilizing a synergistic action of the operators and the drum with the support of the carcass to facilitate and expedite action on the carcass by the operators as needed in an otherwise automatic operation.

BRIEF DESCRIPTION OF THE DRAWINGS

FIG. 4 is a side view of apparatus 20 as seen along the direction of the arrow 4A in FIG. 2.

FIG. 5 is a front perspective and pictorial view of the portion of apparatus 20 shown in zone 5A of FIG. 4.

FIG. 6 shows the assembly 30 in its elevated position, as also shown in FIGS. 9 and 10; FIG. 7 shows the assembly 30 in an intermediate elevated position; FIG. 8 shows the assembly 30 in a lowered position near to the bottom of its vertical path, generally as shown in FIG. 11 and FIG. 8 is also broken away in part to show structures within the frame drive drum chamber 40.

FIG. 9 shows the operators 60 and 65 at time of the initial attachment of the carcass hide to the chains 52 and 53 of the skinning drum assembly 50.

FIG. 11 shows the operators 60 and 65 operating on the hide 72 of the carcass 70; FIG. 11 shows the operators 60 and 65 during a stage of the cattle dehiding operators performed by the operators 60 and 65 and the apparatus 20 when the major portion of the hide has been removed from the carcass and has been wrapped around the drum 51.

FIG. 12 shows the position of the hide, carcass and operators at the termination of a cattle dehiding operation performed by the operators 60 and 65 and the apparatus 20.

FIG. 13 is a diagrammatic frontal view of the apparatus 20 and initial position of compartments 36 and 37 and operators 60 and 65 thereon for operation on a carcass 70;

FIGS. 14-18 are diagrammatic sectional views along plane 14A—14A of FIG. 13 and showing the same level of packinghouse rail 85 and floor 81 for all of FIGS. 13 through 18 to illustrate a typical sequence of relative position of the skinning drum 51 relative to the carcass during representative stages in the operation of removal of hide from a carcass by the apparatus 20 and operators 60 and 65.

FIGS. 2, 3, 4 and 5 are to scale and to the same scale to illustrate functional relations below discussed. FIGS. 1 and 6 through 12 are pictorial and in perspective to illustrate three dimensional aspects of the apparatus 20; FIGS. 13-18 are diagrammatic.

DESCRIPTION OF THE PREFERRED EMBODIMENT

The apparatus 20 comprises a rigid stationary vertically extending rigid base assembly 21 and a traveling operator and drum support assembly 30.

Figure 2:
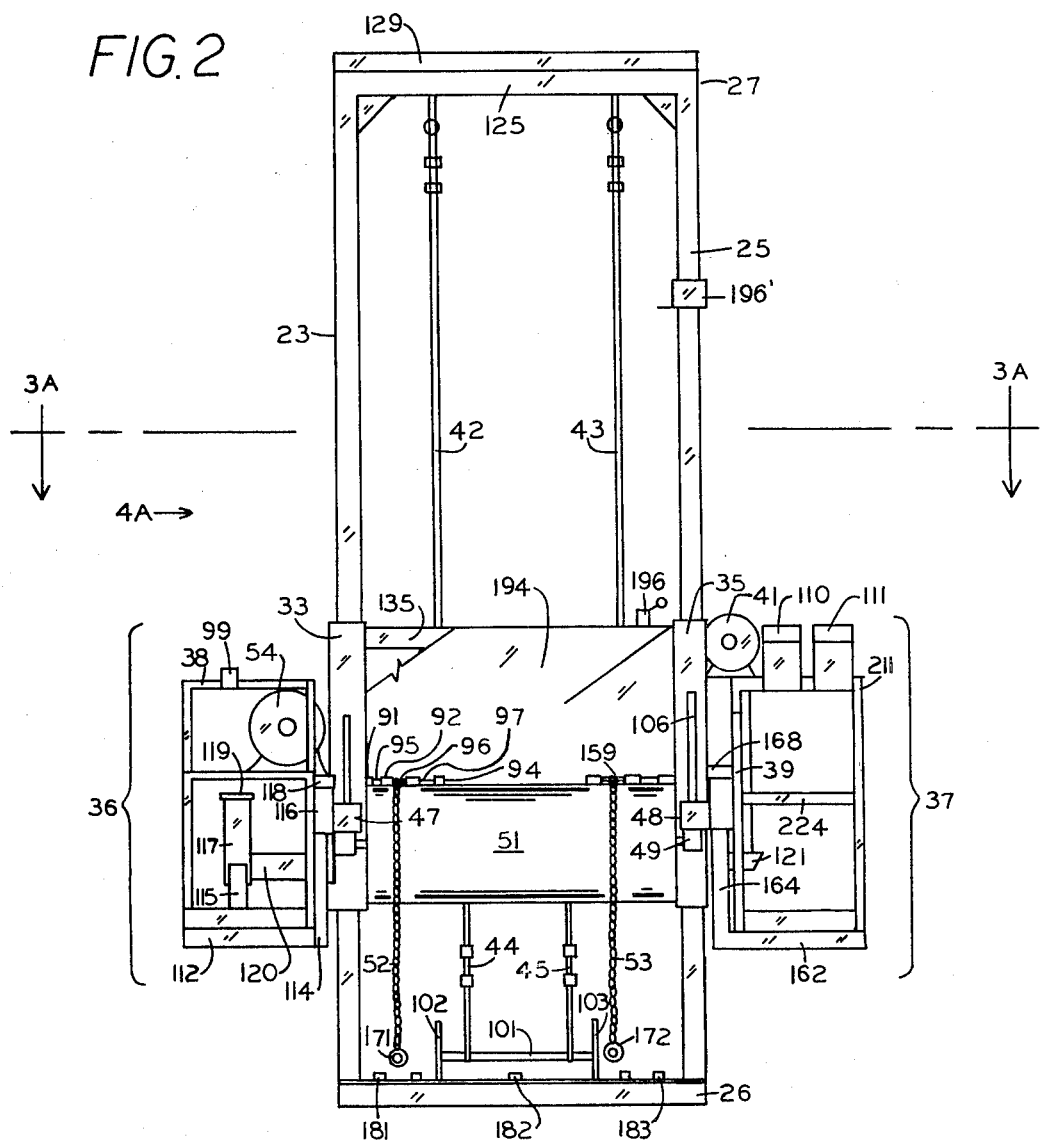
FIG. 2 is a front view of the apparatus 20.
Figure 3:
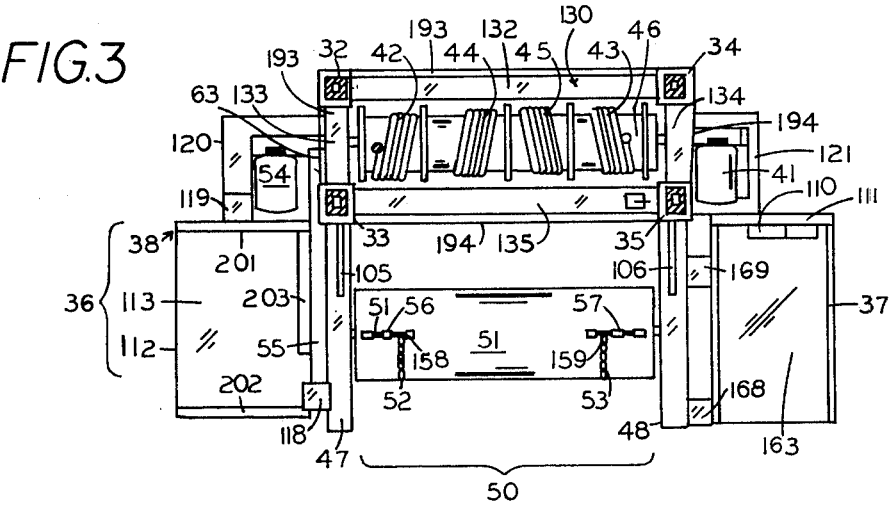
FIG. 3 is a transverse sectional view of apparatus 20 along the transverse horizontal section at plane 3A—3A of FIG. 2 and showing also a plan view of the apparatus 20 below section 3A—3A.

The terms "right" and "left" as used throughout the description of the embodiment 20 refer to right and left as the viewer sees right and left respectively in FIG. 2; the term "rear" being the top as shown in FIG. 3 and the left side as shown in FIG. 4; the front to rear direction being indicated by the arrow 4B in FIG. 4.

The stationary base frame assembly 21 comprises, in operative combination, a series of vertically extending rigid columns 22-25, a rigid top frame 27 and a rigid bottom frame 26. The rigid vertically extending column members are a left rear vertical column member 22, a left front vertical column member 23, a right rear vertical column member 24, and a right front vertical column member 25.

Upper frame 27 comprises front and rear rigid horizontal beam members 125 and 126 and left and right horizontal beams side members 127 and 128, all rigidly and firmly joined together at their corners. Frame 27 supports a horizontal top rigid transverse center bar 129 by its ends, which lateral ends are firmly attached to the top surface of members 127 and 128.

The bottom of the rigid rectangular horizontally extending top frame 27 is firmly attached at its corners to the top end of each of the column members 22–25 and the rigid rectangular horizontally extending bottom frame 26 is firmly attached at its top to the bottom ends of each of the column members 22–26. The firm attachment of the top frame 27 and the bottom frame 26 hold the vertical column members firmly in place relative to each other and parallel to each other, as shown in FIGS. 1, 2, 4 and 6–8.

The lower frame 26 comprises a rigid plate 100 and supports thereon, firmly attached thereto; a pair of rigid left and right hold down brackets 102 and 103. A rigid horizontally extending cable holding bar 101 is firmly held by and between the brackets 102 and 103 and serves to hold the lower end of cables 44 and 45, as shown in FIG. 2 and below discussed.

The plate 100 is firmly held to the floor 81 of the packinghouse 80 by a series of sturdy bolts as 181–186.

The traveling operator and drum support assembly 30 comprises a rigid horizontally and vertically extending rectangular prismatic frame 31—hereinafter referred to as the prismatic frame 31—operator compartments 36 and 37, and a frame drive drum 46 and a drive motor and motor controls therefor; and a skinning drum assembly 50.

The frame 31 comprises rigid sleeves 32–35 joined by rigid frame members 132–139, left and right motor support frames 120 and 121 and cantilever drum support arms 47 and 48, all firmly and rigidly joined together, as shown in FIGS. 2–8.

Figure 7:
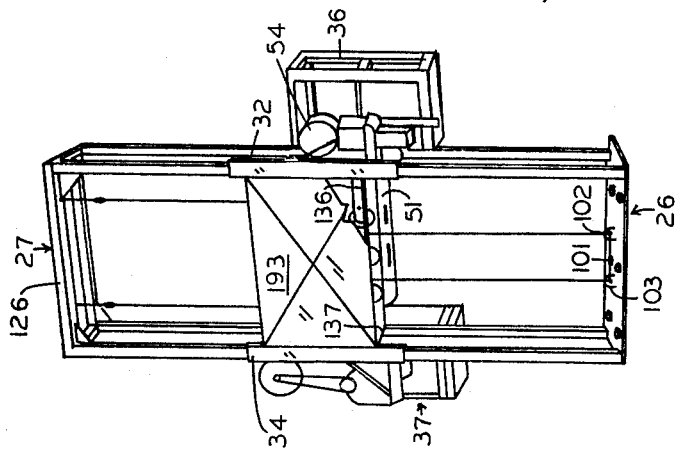
Figure 8:
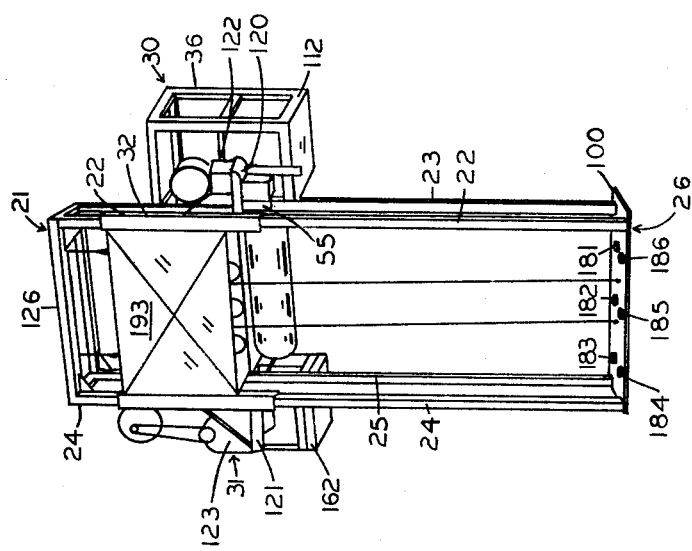

The vertical column members 22, 23, 24 and 25 have externally smooth vertical surfaces and, in horizontal section, —as seen in horizontal cross-section, as shown in FIG. 3—are square with rounded corners and the sleeves 32, 33, 34 and 35 have smooth interior surfaces of the same square shape as the exterior of members 22, 23, 24, 25, as also shown in FIG. 3. The horizontally extending rigid frame members 133, 132, 134 and 135 are firmly located between upper ends of members 22–25, as shown in FIG. 3 and form an upper horizontally extending frame 130; similar rigid frame members 136, 137, 138 and 139 form a lower rectangular rigid open frame 131 firmly attached to the lower end of sleeves 32, 33, 34 and 35, as shown in FIGS. 7 and 8. The lower frame 131, upper frame 130 and sleeves 32–35 surround a frame drive drum chamber 40 within which are located the frame drive drum 46 and ends of cables connected thereto. Horizontally extending rigid cantilever skinning drum support arms 47 and 48 extend forwardly from the front end of sleeves 33 and 35 (see FIGS. 2 and 3) respectively, and are firmly attached thereto at their rear ends.

The arm 47 is also attached to sleeve 33 and supported thereby by a rigid fish plate 105 and the arm 48 is also firmly attached to sleeve 35 and supported by a rigid fish plate 106 attached at its rear to the sleeve 35; the front and bottom edges of the fish plates 105 and 106 attach to the arms 47 and 48, respectively.

Each of left and right imperforate drum chamber cover plates 191 and 192, respectively, extend between sleeves 32 and 33 on left and 34 and 35 on right side of the chamber 40 and is firmly attached thereto and front and rear drum chamber cover plates 194 and 193 extend between and are firmly attached to sleeves 33 and 35 on front and 32 and 34 on rear, respectively; each of these cover plates extend between the upper frames 130 and lower frame 131 and is firmly attached to the corresponding member of such frames as well as firmly attached to the vertical sleeves above mentioned.

The prismatic frame 31 comprises horizontally and laterally extending rigid left motor frame 120 firmly attached to and supported by sleeves 32 and 33 and a horizontally and laterally extending rigid right motor frame 121 firmly attached to right sleeves 34 and 35.

A frame movement drive drum 46 is supported in journals 107 and 108 on the arms 137 and 139 of the frame 31. The journals rotatably support the cylindrical rigid horizontal drive drum 46.

A left top flexible cable 42 and a right top flexible cable 43 are attached at their upper ends to the top static frame 27 and at their lower end are wrapped around the lateral portions of the cylindrical drum 46 as shown in FIGS. 3 and 8. The top ends of each of left flexible bottom cable 44 and right bottom flexible cable 45 are wrapped around the left and right central portions of drum 46, as shown in FIG. 3; those cables, at their lower ends, attach firmly to hold down bar 101. A frame drive motor 41 supported on right motor support frame 121 is operably connected through a gear drive mechanism 123 to the drum 46 and is controlled by three-way switch 110 on operator platform 37 for moving the assembly 30 upward and downward along the stationary frame 21. One position of switch 110 provides for connecting the motor 41 to drive the assembly 30 upward while a second position thereof drives the assembly in the opposite direction; a third position fixes the moving assembly 30 on the stationary assembly 21.

Figure 6:
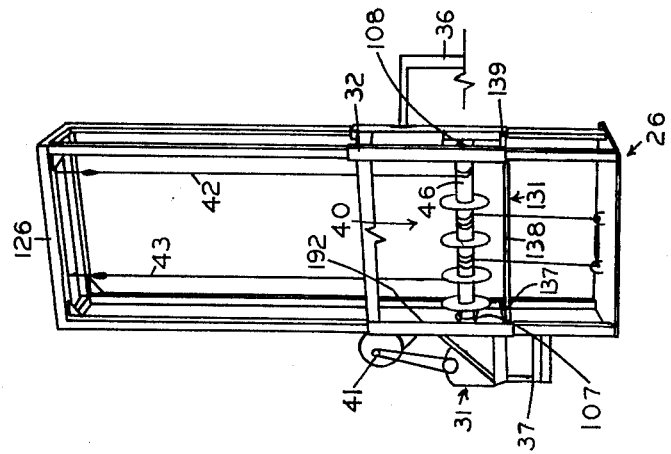
FIGS. 6, 7 and 8 show a sequence of positions of the movable skinning drum and operator compartment assembly 30 during operation of the apparatus 20, as seen in rear oblique and pictorial view of the apparatus 20 from the left and rear side thereof from ground level.

The power connections of the motor 41 provide that, in one position of the switch 110, the drum 46 turns counterclockwise, as viewed from the right side of FIGS. 2 and 3. The frame 31 then moves downward along the frame 21, as the cables 44 and 45 are wound around the drum 46 and cables 42 and 43 unwind. On change of position of switch 110 to its second position, there is a reversal of the motion of the gear 123 and the drum 46 rotates in a clockwise direction and the cables 42 and 43 wind on the drum 46 and move the frame 31 and the platforms 36 and 37 upward to a position as shown in FIG. 6, while the cables 44 and 45 unwind from drum 46.

One, left, side operator's compartment 36 is located on the front and left of the prismatic frame 31 and to the left side of the left drum support arm 47. Another, right, side operator's compartment is located forward of sleeves 33 and 35 on the right side of the right drum support arm 48. Compartment 36 serves to support an operator 60 thereon and another operator 65 is supported on compartment 37. Compartment 36 has a rigid horizontally extending floor frame 112 and vertically extending railings as 39 that are rigidly attached to each other and such compartment frame is firmly yet movably supported on the frame 31. In compartment 36 the rigid floor frame 112 supports a rigid perforated grid or floor 113 thereabove. The floor frame 112 is firmly attached to vertically extending rigid support arm 114 at the central portion of frame 112 and a like arm 115 at its rear. The support arms 114 and 115 engage with sleeves therefor 116 and 117, respectively, that are firmly attached to the frame 31; more particularly, the sleeve 116 is rigid and vertically extending and attached to the forward end of left side of left cantilever and drum support arm 47 and the sleeve 117 is vertically extending and rigid and attached firmly to the front edge of the left motor frame 120. The arms 114 and 115 have firmly attached thereto rigid caps 118 and 119, respectively, at the upper ends thereof thereon which serve to engage the upper ends of the sleeves 116 and 117, as shown in FIGS. 2 and 4 and 5 so that compartment 36 is, in elevated position (of platform 36), firmly supported on the assembly 31.

The right side operator compartment 37 has a rigid floor frame 162 and railings 38 that are rigidly attached to each other and such compartment frame is firmly yet movably supported on the frame 31. The floor frame 162 is firmly attached to and supports a rigid perforated grid or floor 163 thereabove. The floor frame is firmly attached to rigid vertical support arms 164 and 165; support arms 164 and 165 engage with sleeves therefor 166 and 167, respectively, that are firmly attached to the arm 48 of frame 31; more particularly, the sleeve 166 is attached to the front portion of the left side of the arm 48 and the sleeve 167 is attached firmly to the rear portion of the left side of arm 48. The arms 164 and 165 have, at their upper end, rigid caps 168 and 169, respectively, firmly attached thereto and which serve to engage the upper ends of the sleeves 166 and 167, as shown in FIGS. 2 and 5 (for 166) so that the compartment 37 is firmly supported by the assembly 31.

The skinning drum assembly 50 is supported on the traveling frame assembly 30 and comprises a skinning drum 51, hide holding chains 52 and 53, a skinning drum drive motor 54, and a housing 55.

The skinning drum 51 is a rigid smooth-surfaced cylindrical horizontal drum rotatably supported at its right end on an axle rotatably supported in a journal 49 at the bottom of arm 48 and, on its left end, on a drive wheel sprocket shaft rotatably supported within housing 55 on arm 47. Each of the rectilinear series of spaced apart rod holders 56 on the left end and 57 on the right end, respectively, as shown in FIG. 5, of the cylindrical drum surface support a rigid straight rod 58 and 59, to each of which rods one end of one of chains 52 and 53 is attached. Each series, as 56, of rod holders comprises a series of rigid short lengths of pipe as 91, 92, 93, 94, each such length firmly attached to drum 51 with the cylindrical spaces in each of said pipe lengths coaxial with the other and londitudinal spaces as 95 (between 91 and 92), 96 (between 92 and 93), 97 (between 93 and 94) between the co-axial lengths of pipe; the rod 58 extends between the sleeves or pipes; the fixed end of a chain as end 158 of chain 52 and fixed end 159 of chain 53 may be located more or less laterally relative to the drum center, as below described—more lateral location on drum 51 for larger, wider, animals, more central location for smaller or thinner animals.

The skinning drum drive motor 54 is firmly attached to and supported on the left motor support frame 120 and is operably attached to a chain drive 63 located in the housing 55; chain drive 63 is operatively attached to a sprocket wheel 64 in the housing 55 to which the left hand end of the axle of skinning drum 51 is attached. A switch control 111 on the railings on one of the compartments as 37 provides for control of the skinning drum to drive it forward (clockwise in FIG. 4) or backward or to relieve it from a driving connection to the motor 54 and hold drum 51 stationary.

In use, the apparatus 20 is located in a substantially continuous packinghouse conveyor operation; that provides for dressing and butchering into primal cuts; in such operation the animal is killed and hung by its hind feet as 147 and 148 on hooks, as 87 and 88; the hooks 87 and 88 are movably supported on wheels 88 and 89 on a monorail 85 which monorail is rigid and is supported firmly by brackets on the roof 82 and walls of the packinghouse. The hooks 77 and 78 are pivotally supported on hook brackets 86 and 87 provided with wheel supports 88 and 89 and that roll on the monorail 85; the monorail extends horizontally and the carcass as 70 is moved from one dressing operation to the next while supported on the monorail 85 by the hooks 77 and 78.

In a carcass treatment step immediately prior to the operations performed on apparatus 20, the hide of the suspended carcass 70 is cut longitudinally or along the length of the carcass along the carcass underside from its crotch 146 to its throat 149 and the thus exposed superficial fascia is cut by an operator at the front of the carcass to separate the front portions of the hide from the deep fascia investing the muscle immediately therebelow and form narrow flaps on each side of such longitudinally extending cut. As a result of such preliminary operation, the hide 70 then has a left flap 177 and a right flap 178. An operator standing to the rear of the back of the carcass then makes a short cut in the hide and in the superficial fascia therebelow at the tail region to separate the hide from the deep fascia therebelow.

Figure 1:
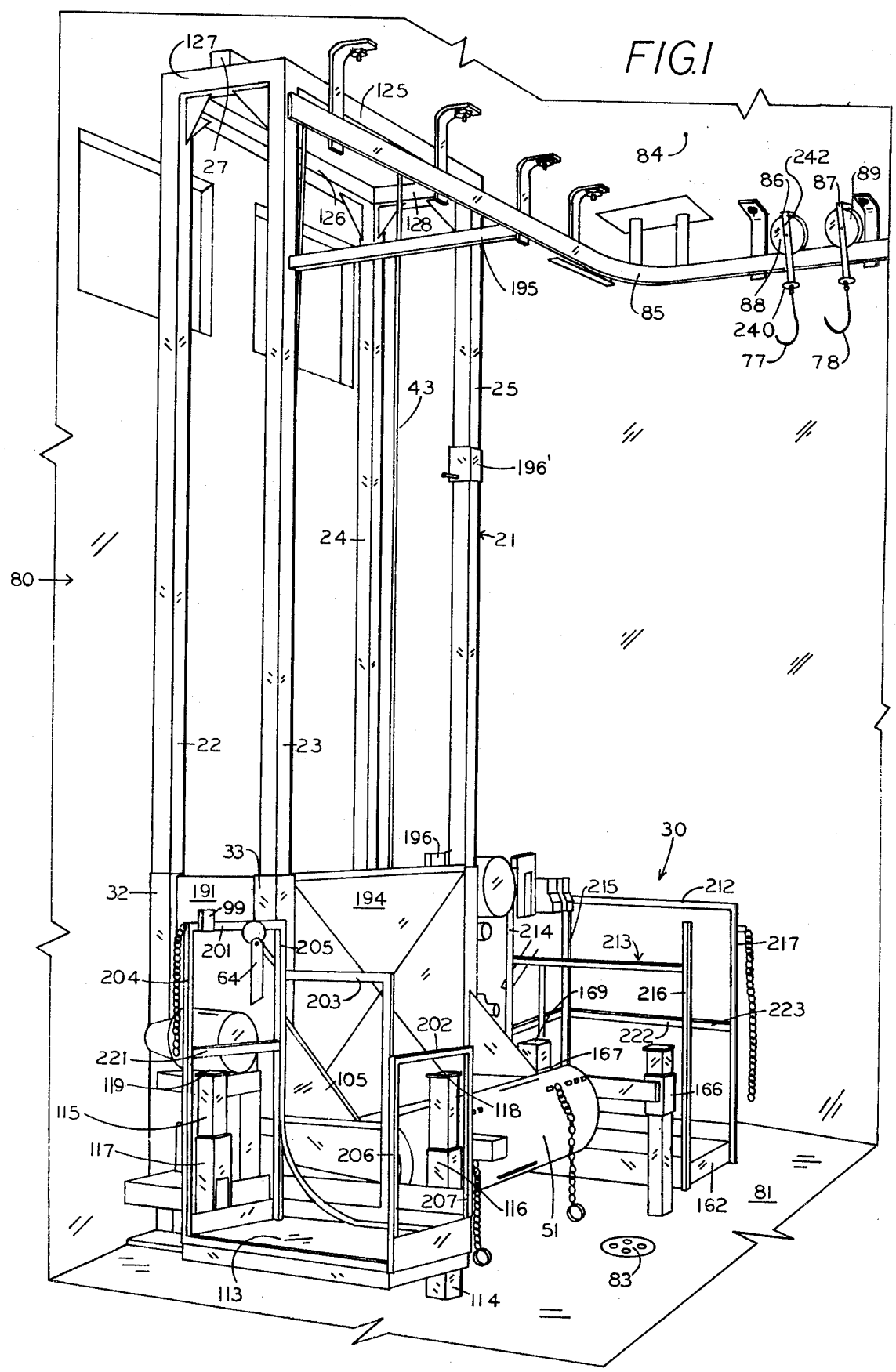
FIG. 1 is a front oblique view of the apparatus 20 according to this invention in its operative position at a location suitable for its operation.
Figure 9:
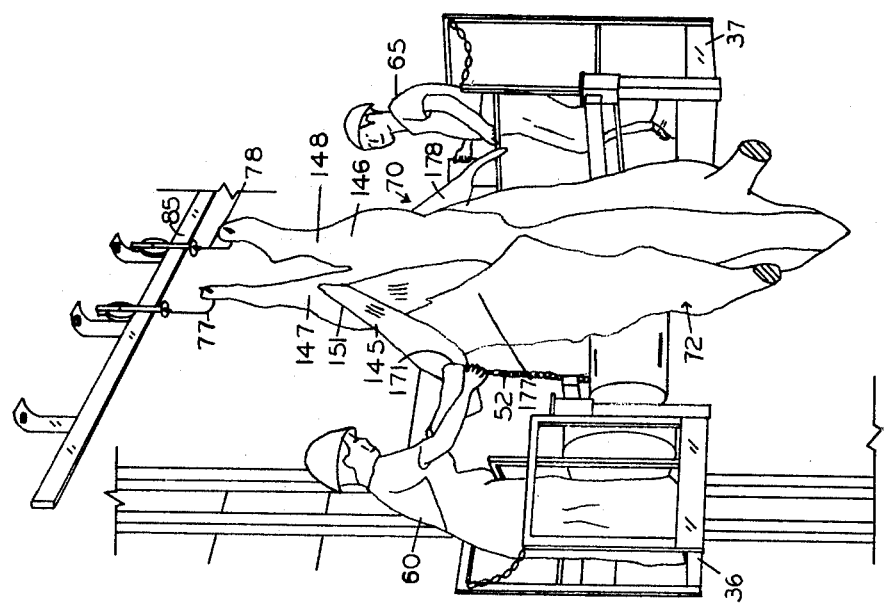
Figure 12:
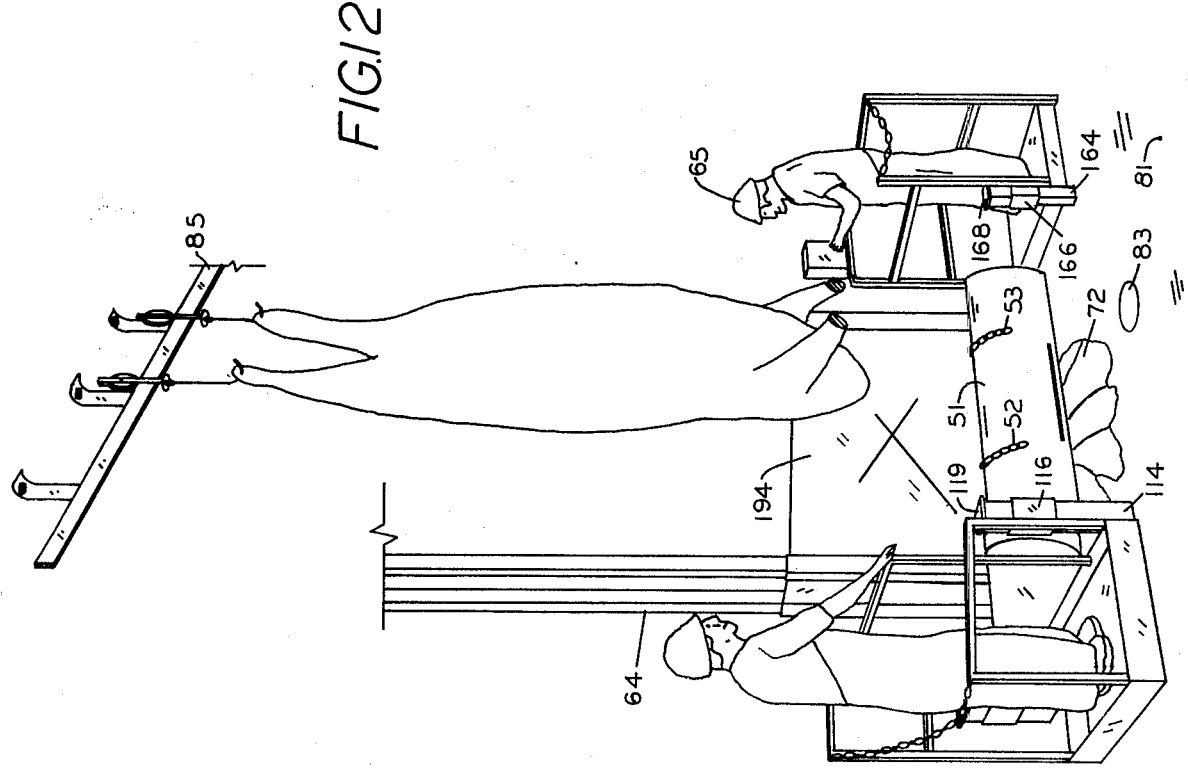

In the operation illustrated in FIGS. 9-18, the carcass 70 is then supported on hooks 77 and 78 and is transported into position as shown in FIGS. 9, 13 and 14 (while compartments 36 and 37 are in lowered position as shown in FIGS. 1 and 12) from the right hand side of the monorail 85.

The carcass 70 in such condition of being slit ventrally, as by slit 190 is then located with its back forward to the front edge of the drum 51 and the sides of the animal carcass generally located between the vertical planes in which the central surfaces of arms 47 and 48 lie.

The railings or railing assembly 38 of the operator compartment 36 comprise a rigid horizontal top rear railing, 201, a front rigid top railing 202 and a top rigid left compartment central railing 203 firmly joined together and to corner vertical railing posts 204, 205, 206 and 207 firmly attaching each such top railing to the compartment frame, as shown in FIGS. 1, 2, 3 and 4. The railings or railing assembly 39 of the operator compartment 37 comprise a rigid horizontal rear railing 211, a lateral rigid top railing 212 and a top rigid right compartment central railing 213 firmly joined together and to vertical railing corner posts 214, 215, 216 and 217 firmly attaching each such top railing to the right compartment frame 162. Other rigid railing bars as 221-224 are firmly attached to and located between the vertical posts of each compartment, as shown in the FIG. 1, serve to protect the operators by barring passage of the operator's body members past the posts below the top railings.

The frame and front railings of each operator compartment extend forwardly of the front edge of the skinning drum 51 so that each of the operators as 60 and 65 may, as illustrated readily reach all points on one side of the carcass, as 70 from which hide is to be removed, while that carcass is suspended with its back forward of the front portion of the exterior surface of drum 51 the compartments each reach rearwardly to a point between the horizontal central longitudinal axis of the drum 51 and the plane of panel 194 on the drum chamber 40 of the prismatic frame 31 at the front of sleeves 33 and 35.

Each of the operator compartments 36 and 37 (shown to scale in FIGS. 2-4 and pictorially in FIGS. 5 and 9-12) is supported on the rigid arms 47 and 48 with the horizontal platform floors 112 and 162 above the vertical height or level of the bottom of the drum 51 so that the length of hide removed from the carcass and extending between the drum 51 and the zone of attachment of the remainder of such hide to the carcass, as at zone 151-154 in FIGS. 14-18, is a substantially constant length of about 2½ feet (2 to 3 feet range) long during the entire skinning operation: the combination with the elasticity and extensibility of such freshly removed hide such length of hide and the relative consistency of length thereof (between drum and carcass attachment of the hide) provides a shock-absorbing action that avoids peaks of stress application to the points of support of the carcass on hooks 77 and 87, as well as vertebral damage to the carcass 70 during the removal of the entire hide from the carcass in one piece as provided by the apparatus 20 and operators 60 and 65 according to my process.

In operation of the apparatus 20, one operator, as 60, grasps a loose left end portion of the hide 72 and attaches the free end 171 of a chain as 52 thereto (the free end of the chain 52 is that end 171 opposite to the end 158 of the chain 52 attached to the drum).

In operation of the apparatus 20, one operator, as 65 grasps a loose right end portion of the hide, 72, and attaches the free end 172 of a chain as 53 thereto (the free end of the chain 53 is that end 172 opposite to the end 159 of the chain 53 attached to the drum); thereby, carcass 70 is located between the planes wherein are located the vertical planes, parallel to arms 47 and 48, wherein the fixed ends 158 and 159 of the chains 52 and 53 lie.

The superficial fascia between the hide and the deep fascia has some elasticity and the length of hide, also elastic and extensible, between the attachments of the hide to the drum and to the carcass has substantial length. Accordingly, location of the carcass between such fixed ends 158 and 159 of the chains 52 and 53 in apparatus 20 provides automatic control of movement of the carcass towards one operator (or to the other) depending on which side of the animal is then under the greater tensile force toward the drum and, therefore, more needs cutting action, and directs the operator, as 60 or 65, to promptly cut the superficial fascia at such zone of greatest tension and frees an increment of hide to drum 51 and so reduces the tension of the hide on the remainder of the carcass during the removal of such hide from such carcass.

In operation of the apparatus 20, in general, provides that the carcass 70 has its hide removed by a coaction of (a) the downwardly moving frame 31, (b) the skinning drum 51 which serves to orient the carcass as well as pull the hide from the animal, and (c) the operators 60 and 65 who are supported in compartments 36 and 37 at each of a series of positions whereat they conveniently and rapidly cut away superficial fascia—an elastic areolar connective tissue between the hide of the animal and the deep fascia investing the muscle layer therebelow—by knives 64 (wielded by operator 65).

The frame 31 is arranged to be controllably moved downward at rates that are convenient for each of the operators to cut the superficial fascia between hide and deep fascia and so separate the hide from the muscular layer therebetween by use of a knife, as 64 and 69, as shown in FIGS. 9-12. At the zones requiring cutting during and after such cutting, the hide 72 is removed by the pulling action thereon of the drum which is driven by its motor 54 to rotate in a clockwise direction, as seen along the direction of arrow 9A of FIG. 5, to which rotary motion there is added the downward motion of the entire operator and drum support assembly 30 relative to the rail 85.

One aspect of the process herein and the design of the structure therefor is to provide compensation for my observation that (a) the hide of the animal has a variable length of attachment along the perimeter of the carcass measured horizontally, as shown in FIGS. 9 through 18 at each of the sequential positions along the spine from tail to the thurl to barrel to heartgirth to withers to neck, and (b) the animal's skin or hide is elastic and extensible, and (c) the elasticity and extensibility of the attachment of the subcuteneous superficial fascia connective tissue (the areolar layer between the base of the skin or hide attaching the skin or hide to the deep fascia which envelopes the bones and muscle sheath of the animal) varies from the dorsal to the ventral portions at any transverse section between the tail end 140 and head end 141 of the animal.

Accordingly, the force required to pull each increment of hide as 142 from each increment of length as 143 of the animal carcass varies substantially along the tail to head length of any one animal. Further, considering each of a series of different animals, the force to pull hide from each increment of length of any one animal at one portion of the animal varies substantially from the force required to pull skin from an increment of length of some other animal to be slaughtered.

The apparatus 20 does not attempt to provide that the vertical displacement of compartments 36 and 37 and drum 51 alone controls the amount of hide removed; rather, the increment of hide collected on drum 51 varies, from increment to increment of vertical displacement of the compartments 36 and 37; the apparatus 20 permits limiting the maximum tension applied to the hooks 77 and 78 at the feet as 147 and 148 of the animal or potentially harmful to back of the animal and thereby avoid tearing such attachment which tearing would cause a fall of the animal carcass 70 to the slaughterhouse floor and thereby result in wastage of the entire animal (the cleanliness of the animal's carcass is extremely important to the marketability) as well as avoiding undesirable stresses on the back of the animal carcass.

By the use of apparatus 20, increments of length of hide of varying width from tail to neck are removed at a varying rate vertically along length of the stationary carcass from tail to neck while drawing said increments of length so removed onto the rotating drum 51 while under tension, with superficial fascia between said hide and carcass being stretched and exposed; and cutting the superficial fascia between said hide and carcass exposed between said hide and carcass on drawing said hide from said carcass.

FIGS. 13 through 18 are all drawn to the same scale although diagrammatically and are shown with the rail 85 at a constant height in each of the figures as a referent of height for each and all of the FIGS. 13-18 to provide a showing of the relative movement of the drum 51 relative to rail 85 and carcass 70 and the floor 81. As there diagrammatically shown, at the initiation of the operation of dehiding a carcass as 70, as also shown in FIG. 9, each of the chains as 52 is attached to a portion of the hide 72 between the back and the hoof and the chain 53 is attached to a corresponding portion of the hide on the right side of the carcass, generally as shown in FIG. 13. Using knives 64 and 69, the operators 60 and 65 then slit the superficial fascia, as at 144, joining the hide to the deep fascia over the muscular sheaths of the carcass. The drum 51 is then rotated in a clockwise direction as shown in FIG. 14, but the frame 30 then has no particular substantial movement. Accordingly, at such initial stage of operation, the drum gathers in much hide but the compartments 36 and 37 then have no substantial vertical movement, although there might be some very slight movement of the frame 30 downward.

As generally illustrated in FIGS. 9-18, at the initiation of the operation, the operator's knives contact the left and right thurl portion of the carcass at which (as shown in dotted lines in FIGS. 14-18) there is a substantial length of attachment of hide to deep fascia along the length from the thurl 145 to foot 147.

Figure 10:
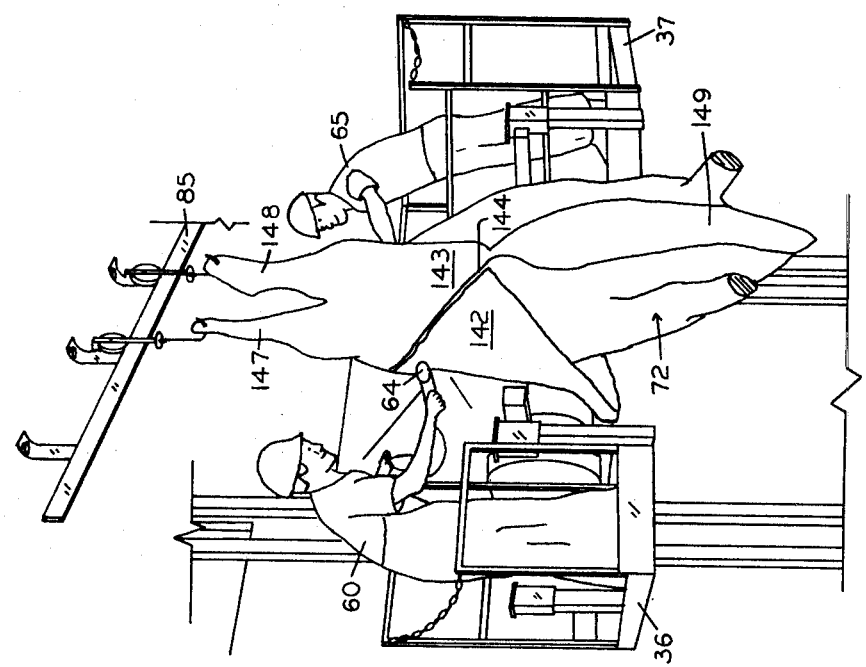
FIGS. 9, 10, 11 and 12 illustrate principal stages in the operation of the apparatus 20 and the operators 60 and 65 supported thereon in relation to a carcass 70 treated by said operators and the machine 20.

In the next stage of operation, as diagrammatically shown in FIGS. 15 and 10, the operator slices very little of elastic connective tissues (called superficial fascia) between the deep fascia and the inner layer of the hide in zone 152 and drum 51 is forcefully turned by its motor 54 (under control of the operators) and the hide or carcass skin is pulled downward by the drum and around the drum because in this zone, the perimeter of the animal (in a horizontal plane transverse to the spine of the carcass) is reduced and the frame 30 moves downward at a substantial speed. During this motion, much hide, i.e. a substantial length measured in vertical direction, is pulled by the drum from the animal while the operator manually severs relatively few points of superficial fascia connective tissue joining the interior surface of the hide to the deep fascia sheath therebelow. The movement of the frame 31, which is controlled by the operator 65 acting on switch control for motor 41, and the rotating action of the drum 51 attached to the hide, causes the rapid removal of the hide from the carcass.

The cutting action of the blades of each of the operators is directed at the connective tissue at the level of the heart-girth, i.e., near the shoulder of the animal, zone 153-154 of FIGS. 16 and 17, where the perimeter of the animal increases as downward motion of the drum 51 and frame 31 continues from the position shown in FIG. 15. As the force then applied by the drum against the hide to strip it (the hide) from the carcass increases, as the drum continues its rate of pull in zone 153, the operators must sever more of the connective superficial fascia tissue between the theretofore interior surface of the hide and the theretofore exterior deep fascia sheaths of the carcass; i.e., as the area of hide removed from the carcass for each linear displacement in a vertical direction of the frame 30 relative to the rail 85 and floor 81 and carcass 70 increases the linear speed of the drum periphery is decreased to allow the operators sufficient time to cut such additional length of perimeter as is then presented by the removal of the hide from the carcass therebelow.

At zone 154-155 of FIG. 17, where the length of the attachment of the chain is below the maximum heart-girth area and there the perimeter of the carcass decreases in the downward direction, there is less likelihood of any damaging pull by the chains 52 and 53 on the carcass as would damage the carcass or cause the carcass to lose its connection to the hooks 77 and 78 supporting the carcass (because the amount of the cross-sectional area of superficial fascia between the theretofore inner layer of the hide and the deep fascia sheath overlying the muscles of the carcass is decreasing). As then operators 60 and 65 have less length of such superficial fascia to cut and therefore may take care of such cutting in a short interval of time, they, therefore, control the drum 51 to rotate at a fast rate of speed for each increment of downward motion of the frame 30 in that zone.

In the position shown in FIG. 18, where the shoulders of the animal have been stripped of hide and only the neck area of the animal, zone 155-156, is still covered with hide and such zone or neck area has only a small perimeter, the force required to strip the hide from such area is small and does not affect the supporting connection at the hooks 77 and 78 and the remainder of the carcass. Accordingly, once the carcass has had the hide thereof removed to a level below (as shown in FIGS. 13 and 17) the forelegs of the animal, the drum 51 is moved further down below the level of the platforms 36 and 37 and rotated and then rapidly and smoothly removes the remaining hide from the carcass without any cutting action required by the operators and without any harmful action on the support of the carcass by the hooks 77 and 78.

In particular, referring to the stages of operation shown in FIGS. 9-18, the action of the apparatus 20 provides that, in the initial stage of dehiding operation, as shown in FIGS. 9, 13 and 14, wherein the line of attachment of hide to deep fascia initially extends along line 151 (FIGS. 9 and 14) and finally extends along a line as 152 (FIG. 15), the frame 30 does not move downward substantially while the front portion (rightwards as shown in FIGS. 4 and 14) surface of the drum 51 undergoes substantial translatory downward movement due to rotation of the drum driven by its motor under control of the operators and much hide is removed for substantially no vertical translation of the compartments 36 and 37; during such initial stage, with platforms 36 and 37 thus stationary, the time is provided to the operators to perform the severing of all portions of the long length of superficial fascia connective tissue between the hide and the carcass muscle sheath while no undesirable amount of stress is applied to the carcass as might pull the carcass from its support.

During this stage of operation, the portions of the superficial fascia under highest stress are exposed to operators' view and the lateral attachment of the lower ends (in FIGS. 9-11 and 13-18) of chains 52 and 53 to drum 51 at rods 58 and 59 provides that the portions of the carcass hide and superficial fascia at which tensile force (to the deep fascia) are greatest cause the carcass 70 to rotate about a vertical axis between the hooks 77 and 78 and to pivot the carcass 70 about an axis along the horizontal axis provided by the line of the top edge of rail 85 toward the attachment of chains 52 or 53 on drum 51 where such points of high tension are not visible to the eye of the operator. The hind legs 147 and 148 are shown in dotted lines in FIGS. 14-18 to indicate the length of hide attachment to the corresponding length of spine of the animal, although, as shown in full lines, the legs extend vertically due to the suspending of the carcass from the rail 85.

The points of attachment as 158 and 159 of the chains 52 and 53, respectively, are lateral of the sides of the carcass to accentuate this action which action directs and facilitates and expedites the attention of the operators 60 and 65 to the application of the cutting action of the operators to those zones of superfiscial fascia most immediately requiring such cutting action. Thereby, at such zones of greater length of attachment of hide to deep fascia, the frame 30 (and drive drum 46) are moved slowly, if at all, to allow the operators time to cut much length of hide. As the hide and the superficial fascia are extensible, the drum is rotated to pull on and collect such severed hide while the height of the operators' compartments, as 36 and 37, remains substantially unchanged; thereby, the force of the drum on the hide is kept below that force which would pull the carcass from its supports.

In the second stage of operation, as shown by change in position of the line of attachment of hide 72 to deep fascia which line of attachment initially extends along line 152, as shown in FIG. 15, and finally extends along a line as 153, as shown in FIG. 10 and in FIG. 16, where the perimeter of attachment of hide to carcass is reduced, there is a substantial movement of the frame 30 vertically and not much rotary movement of the drum 51 so that there is a substantial vertical movement of the drum and a rather rapid removal of the hide as measured from the vertical point of attachment of that hide to the animal at level 152 to the vertical attachment of such hide at level 153 and, also, relative to the floor 82 and the rail 85.

Figure 11:
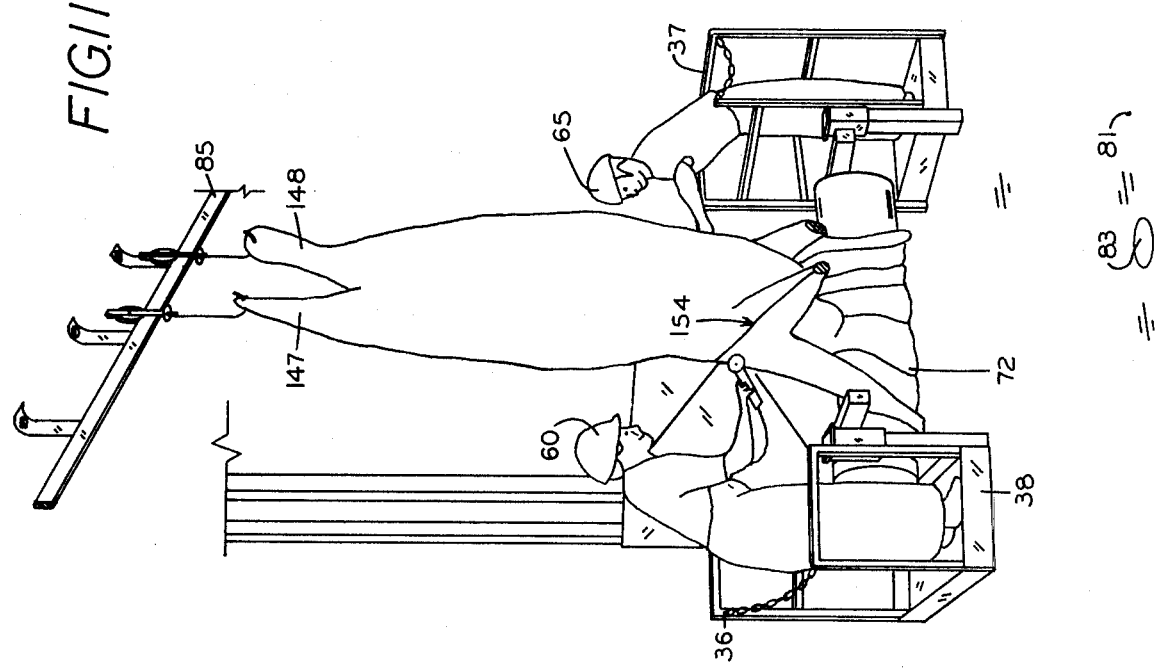

In the third stage of operation, as illustrated by change in line of attachment of hide 72 to deep fascia from initial position along zone 153 (in FIG. 16) to a final position, as zone 154 as shown in FIGS. 11 and 17, the drum rotation action is slowed and, again, the downward rate of movement of compartments 36 and 37 is slowed so that the operators 60 and 65 each have sufficient time to cut the necessary long zone of superficial fascia connective tissue between the extended perimeter of deep fascia (providing the exterior muscle sheath) and the hide theretofore thereabove and then being separated therefrom around a rather long perimeter. This cutting is fast but the drum rotation is performed slowly and avoids any high stresses as would result from an attempt to rapidly strip the carcass hide from such zone of the carcass only by brute force, as such high tensile force might cause the entire carcass to come tumbling down from the hooks 77 and 78 and/or damage the spine of the carcass 70.

After this period of slow downward movement of the frame 30, with the hide then removed to zone 154 (as shown in FIGS. 11 and 18) below the forelegs, at a zone of reduced perimeter of hide, in a fourth stage of operation, illustrated by change in line of attachment of hide 72 to deep fascia from initial position along zone 154 (below the forelegs) to the intermediate position shown as zone 155 in FIG. 18 and a final, completely dehided position shown in FIG. 12, the frame 30 is moved down rapidly and pulls the hide rapidly from the carcass; the drum then (as shown in FIG. 12) moves down while the platforms 36 and 37 for the operators do not move (while the frame 30 moves). This final downward movement of the drum 51 provides for a rapid as well as a complete stripping of the hide from below the forelegs and the neck (a zone of relatively small perimeter of attachment of hide to deep fascia via superficial fascia of the carcass 70) without knife application by the operators 60 and 65 or development of high tensile stress at the points of carcass support.

Accordingly, in the overall operation of this process, there is a varied rate of speed of vertical motion of the frame 30 from its uppermost position as in FIG. 9, to its lowermost position, as in FIG. 12 during the operation of the apparatus 20 in the overall environment in the slaughterhouse (while the drum 51 also rotates at different speeds) so as to provide sufficient time for the operators to do such cutting as is needed at zones of maximum perimeter or strength of attachment of hide to deep fascia and thereby avoid peaks of tensile stress along the length of the carcass as might cause the carcass back to be damaged or the carcass to be loosened from its supports 77 and 78. While such zones of very slow motion of the frame 30 avoid undesired high stresses, they take only a small portion of the total cycle of time of operation and the remainder of the movement of the frame 30 which takes the major portion of length of operation over the carcass length is rapid and quickly removes the hide from the carcass thereof without any knifing action by the operators on the carcass.

During the operation of the apparatus, as diagrammatically shown in FIG. 13, the chains 52 and 53 have an attachment to the drum which extends definitely lateral of the animal, generally as shown in FIG. 13; due to that relationship and due also to that the animal is suspended by its hind legs on the hooks 77 and 78, if one operator, as 60, were to not perform cutting operations as rapidly as the other operator 65 performs the cutting operations, the tension would be greater on the chain as 52 (to and through the stretched and taut hide flap and superficial fascia) to the deep fascia of the carcass on the one side of the carcass closer to the slower operator (as it would be on the other side if the other operator were slower) because the animal is supported only by its uppermost attachment at the hooks 77 and 78 and the animal is thus free to pivot not only about the horizontal axis therebetween but also to rotate about the vertical axis between hooks 77 and 78 (which hooks are each rotatable about a vertical axis through the joint 240 connecting each hook as 77 to the bracket therefor as 242).

If operator 36 does not perform the cutting needed, the tensile force directed between the chain 52 and the carcass due to the lateral connection of the drum 51 to the chain 52 causes the carcass to move toward that operator as 60 who has not removed the attachments of the hide to the carcass (so as to lower the tensile forces therebetween). This movement (leftward is shown in FIG. 13) makes it more difficult and concurrently slows down the operation of the other operator as 65 by creating more of a strain for him to extend his tool, 69, to where the carcass is then located, while the same action provides movement of the carcass toward the operator (60) on the side whereat the connection of the hide to the carcass still needs that operator's attention. This facilitates the first operator (60) to correct the condition.

Accordingly, the apparatus 20 provides a utilization or a synergistic action of the operators and the drum 51 with the carcass to facilitate action on the carcass by the operators as needed.

Dimensions of the preferred embodiment are set out in Table I (Insert A).

TABLE I
DIMENSIONS OF PARTS OF APPARATUS 20

| Columns 22–25 steel | } | $3\frac{1}{4}'' \times 3\frac{1}{4}''$ i.d. |
| Member 125–129 channels | | $4'' \times 4''$ o.d. |

TABLE I-continued
DIMENSIONS OF PARTS OF APPARATUS 20

| | |
|---|---|
| Arms 116, 117, 164, 165 | |
| Base 100 | ½" thick; 37" × 61" |
| Channels 32–35 | 48" long, 4¾" × 4¾" o.d. |
| Sleeves 117, 166 | 4¾" × 4¾" o.d. |
| Plates 146–149 | 20 gauge galvanized sheet steel |
| Motor for frame 41 | 10 HP, 220 V. Waterproof |
| Gear box for 41 123 | 100/1 ratio |
| Frame drive drum 46 | 9" o.d. 50" long |
| Cables 42–45 | Steel cables ⅜" diameter |
| Skinning drum 51 | 15" diameter 51½" long |
| Skinning drum motor 41 | 220 V, 5 HP, 1750 r.p.m. |
| Gear drive for Skinning drum 122 | Dodge speed reducer 50-1 ratio; 9 r.p.m. output |
| Compartment 36: | |
| Floor 112 | 34" × 20" |
| Railings 211–217 | 1¾" steel square tubing |
| Waterproof switches 110, 111 | #805 Allen Bradley switches wired for clockwise, counter-clockwise motion and stop positions |
| Chain 52, 53 | 5 foot of galvanized steel chain 9/16" size |
| Sleeves of Assembly 56 91, 92, 93 | ½" i.d. × ¾ o.d. pipe segments |
| Rods 58, 59 to hold chains 52, 53 | 13½" × ½" bolt |
| Frame 21: | |
| Width, overall (left edge of sleeve 33 to right edge of sleeve 35) | 61" |
| Height (plate 100 to top of bar 129) | 14' 4" |
| Depth (front of sleeve 33 to rear of sleeve 32) | 23" |
| Plate 100 width front to rear | 37" |
| Arm 47 length | 36" |
| Compartments 36 and 37: | |
| Height, bottom of floor to railing top 42" | |
| Width, left to right (FIG. 2) | 20" |
| Depth, front to rear (FIGS. 3 and 4) | 34" |
| Drum 51: Width | 51½" |
| Diameter | 15" |

The time for movement from the initial stages of operation shown in FIGS. 9 and 13 to the final stage of discharge of the hide shown in FIG. 12 for apparatus 20 is, for a cow of about 1100 pounds of size (as shown pictorially to scale in FIGS. 9–12), about 15 seconds (range of 10 to 20 seconds). The time spent at operating stages between FIGS. 14 and 15 is about 4 seconds and the time spent at operating at stages between FIGS. 16 and 17 is about 4 seconds.

As shown in FIGS. 9–12 and 14–18, hide is stripped from the carcass in one piece and in a manner that prevents dirt and debris on the skin or hide from contaminating the remainder of the carcass because the exterior of the hide is, as shown in FIGS. 9–12 and 14–18 and by arrow 22A, directed and folded away from the stripped carcass and directed to a zone separated from the stripped carcass by the hide remaining on the carcass.

After removal of the hide from the carcass, as shown in FIG. 12, the free ends of each chain 52 and 53 that had previously been attached to the hide, as shown in FIG. 9, is readily released as such chains depend for their attachment on the tension in the chain. The hide, in one piece, is then removed from below the drum 51 and then placed in a collection container therefor. The drum 51 and panel 194 are then washed off with clean water by a hose, and the wash water collected in a drain 83 in the floor 81 of the slaughterhouse 80.

The surface of the drum 51 and compartments 36 and 37 and plate 194 are preferably stainless steel to expedite cleaning thereof or may be galvanized steel or steel painted with zinc chromate.

A control switch 196 is a circuit cut-off switch, with stop 196' mounted on one of the vertical frame columns, to limit the height to which the prismatic frame 31 rises. A rigid control arm 195 fixedly locates the monorail 185 relative to the frame 21 and drum 51 and is firmly connected at one end to monorail 85 and at other end to column 33 of frame 21 and fixes the spatial relation of monorail 85 to frame 21.

While the operation of the apparatus has been illustrated and is above described for the rapid removal from a cattle carcass from which the head has been removed, the apparatus 20 and the operation thereof may also be and is, in practice, also applied to a slaughtered cattle and other animals from which the head has not been removed. While the adherence of the hide to the head of cattle is particularly firm and for such removal the rate of hide removal—as measured by speed of frame 31 relative to frame 21 with the carcass suspended on a monorail as 85 which monorail is in fixed relation to the frame 21, as above disclosed—to allow the operators sufficient time to sever the superficial fascia from between the hide and the attachment of such hide to the cartilage and bone as well as muscles in the head region and so avoid undesired mechanical stresses on the support for such carcass (legs as 146 and 148 to hooks) as well as to avoid damage to the back of such carcass as above described.

The compartment 36, which does not have the control switches as 110 and 111 mounted thereon is provided with a cut-off switch 99 which is within ready reach of the operator, as 60, within compartment 36 and is operatively connected to motors 41 and 54 for drums 46 and 51, respectively, and permits the operator, as 60, in such compartment, as 36, to stop the motion of the drum 51 and the frame 31 in event of incapacity or error on the operator, as 65, in the other compartment, as 37.

The apparatus 20, as above illustrated and described, permits the rapid safe removal of hide without damage to the remainder of the carcass, as 70, without use of electrical shock equipment.

I claim:
1. Apparatus for removing hide from a carcass comprising, in operative combination,
   (a) a first vertically extending rigid frame;
   (b) a second vertically extending rigid frame movable on said first frame;
   (c) a first frame drive means operatively connected to said first frame and the said second frame and frame drive control means operably attached to said second frame and drive means for moving said second frame vertically relative to said first frame;

(d) a support means for a rotatable drum on said second frame, a rotatable cylindrical drum rotatably supported on said support means, said drum rotatable about its horizontal central longitudinal axis, and hide engaging means on said drum, and drum drive means operably connected to said drum, and drum drive control means for said drum drive means operably connected to said drum drive means;

(e) two elongated flexible tension bearing means attached to said drum at horizontally spaced apart positions along the surface thereof, said horizontally spaced apart tension bearing means each extending upwardly and centrally from said drum and each being attached at one end thereof to said drum means by means firmly attached to and adjustable along the length of said drum, said hide engaging means attached to each of said spaced apart tension bearing means at an end thereof distant from said one end thereof;

(f) two operator support means each firmly attached to said second frame and vertically movable therewith, said drum being located between said operator support means and said operator support means being firmly supported on said second frame laterally of said rotatable drum means; and each of said operator support means comprises a floor and vertically extending railings, and each of said operator support means extends horizontally in front of the most frontward extension of the said drum, said frame drive control means being supported on one of said operator support means and drum drive means also supported on one of said operator support means;

(g) and a means for carcass support is located in front of and in fixed relation to said first frame above said drum and spaced away by a horizontal distance from said drum and said means for carcass support is located at a position measured along the length of said drum which is between said positions at which said tension bearing means are attached to said drum whereby to support a carcass spaced away by a horizontal distance from said drum, (h) and wherein said frame drive control means and drum drive control means are located on each of said two operator support means.

2. Process of removing hide from an animal carcass also comprising, hide, hind legs and forelegs, said process comprising the steps of (a) firmly supporting said carcass from its hind legs, with its hind legs above its forelegs and the spine of the animal substantially vertical, and attaching two laterally spaced edges of said hide to a horizontally elongated cylindrical drum therebelow at points on the surface of said drum further apart than the distance between said edges of said hide;

(b) and operators for cutting said hide from said carcass being each supported on both sides of said carcass on a platform extending forward of the forward edge of said horizontally extending drum, each of said platforms moving vertically with said frame supporting said drum;

(c) maintaining the hide under laterally and downwardly directed tension between
 (i) the points of attachment of said edges of said hide attached to said points on said drum and
 (ii) the superficial fascia joined to said hide and to the deep fascia of the carcass, (d) varying the downward linear speed of said drum surface and driving a frame supporting said drum downwardly while (e) lessening said speed of said drum surface when a greater force is required to pull said hide from the carcass and increasing said speed when less force is required to pull said hide; and (f) automatically moving the carcass away from one side of the carcass whereat the tension on said pulled hide by said fascia is lesser and away from the operator on the platform on said one side of the carcass and towards another side of said carcass whereat the tension between the pulled hide and said fascia is greater and closer to the operator on said another side of said carcass;

(g) cutting said superficial fascia where the greatest tensile force exists between the hide and the deep fascia and pulling the hide from said carcass on both sides thereof while the pulled hide is maintained under tension in a horizontal as well as vertical direction, said direction extending laterally and downwards of each side of the carcass towards said drum and collecting said pulled hide below the level at which it is pulled from the carcass; and at least one of said operators controls and varies the said downward linear speed of said drum and motion of the frame;

(h) and wherein the carcass is the carcass of a cow and wherein both of said operators control and vary the said downward speed of said drum and motion of the frame.

* * * * *